United States Patent [19]

Chubb

[11] 4,008,758
[45] Feb. 22, 1977

[54] INTERMITTENT ENERGY INPUT SALT BATH CHEMICAL PROCESSOR

[76] Inventor: Talbot A. Chubb, 5023 N. 38th St., Arlington, Va. 22207

[22] Filed: Apr. 17, 1975

[21] Appl. No.: 568,972

[52] U.S. Cl. .............................. 165/94; 165/104 S; 165/105; 126/400
[51] Int. Cl.² .................... F28D 19/00; F28G 1/08
[58] Field of Search ............... 165/104 S, 106, 107, 165/94; 126/400

[56] References Cited

UNITED STATES PATENTS

| | | |
|---|---|---|
| 3,080,706 | 3/1963 | Flynn, Jr. et al. ......... 165/104 S X |
| 3,475,596 | 10/1969 | Lawrence et al. ......... 165/104 S X |
| 3,492,461 | 1/1970 | Lawrence ................. 165/104 S X |
| 3,606,015 | 9/1971 | Bukacek .................. 165/104 S X |

*Primary Examiner*—Albert W. Davis, Jr.
*Attorney, Agent, or Firm*—R. S. Sciascia; Philip Schneider; Melvin L. Crane

[57] ABSTRACT

Solar energy is collected and recoverable in a central place as high temperature heat. The heat is delivered to a large reservoir of salt, thereby raising the temperature of the salt and melting the salt solids. The salt reservoir provides an energy reservoir from which heat is withdrawn for chemical processing. The heat withdrawn from the salt heats the oil shale for the production of gases without the process of combustion burning.

5 Claims, 6 Drawing Figures

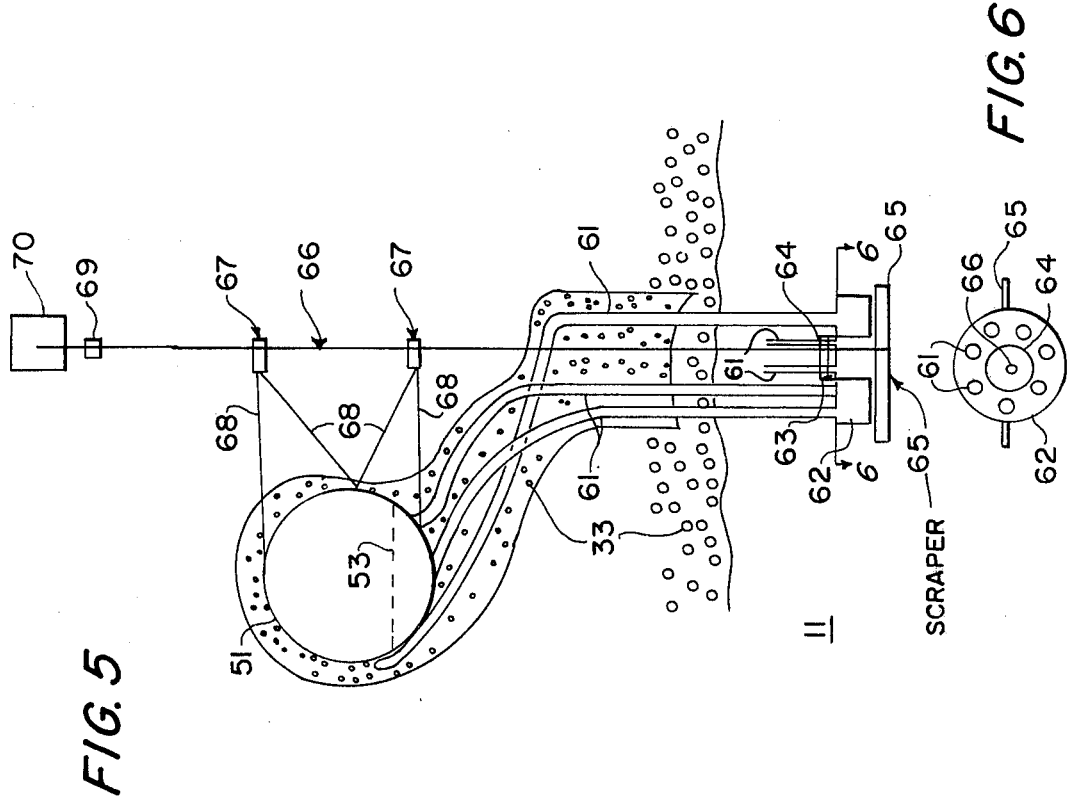

INTERMITTENT ENERGY INPUT SALT BATH CHEMICAL PROCESSOR

STATEMENT OF GOVERNMENT INTEREST

The invention described herein may be manufactured and used by or for the Government of the United States of America for Governmental purposes without the payment of any royalties thereon or therefor.

CROSS REFERENCE TO RELATED APPLICATIONS

This invention relates to a heat storage-heat transfer system as disclosed in Ser. No. 568970 filed Apr. 17, 1975 and to a salt eutectic-storage reservoir as disclosed in Ser. No. 568971 filed Apr. 17, 1975.

BACKGROUND OF THE INVENTION

This invention relates to a heat transfer-heat storage system in combination with a system for delivering heat to raw materials an/or chemicals which require processing at high temperature and more particularly distillation of gases and oils from oil shale and the production of synthesis gas from coal without the requirement for high wattage electrical power or burning of fuel in the production process.

Heretofore delivery of heat for processing chemical reactions, distillation of gases and oils etc., have been carried out by burning of fuel in a production process or by electrical furnaces. Each of these processes require natural resources which are becoming short in supply.

SUMMARY OF THE INVENTION

This invention is directed to the use of solar energy for supplying the necessary heat to be transferred to a heat storage reservoir which heat is withdrawn for heating desired production processes. Solar energy heats a chemical such as $SO_3$ which dissociates into $SO_2 + O_2$, with the absorption of heat energy which is in turn directed through a network of pipes in the bottom of a heat storage reservoir wherein the $SO_2 + O_2$ reacts to produce $SO_3$ with release of about 22K cal/mole of heat. The heat released melts a salt or salt eutectic of $NaCl + CaCl_2$ or $NaCl + MgCl_2$ which stores the heat. The temperature of the melted salt is from 450° C to about 500° C. Apparatus near the top of the melted salt is provided to withdraw heat from the salt to carry out the desired production process. For the purpose of this invention, apparatus for processing oil shale will be described.

BRIEF DESCRIPTION OF THE DRAWINGS

FIG. 5 illustrates a more detailed cross sectional view of the heat transfer mechanism of the apparatus of FIG. 4.

DETAILED DESCRIPTION

Figure 1:
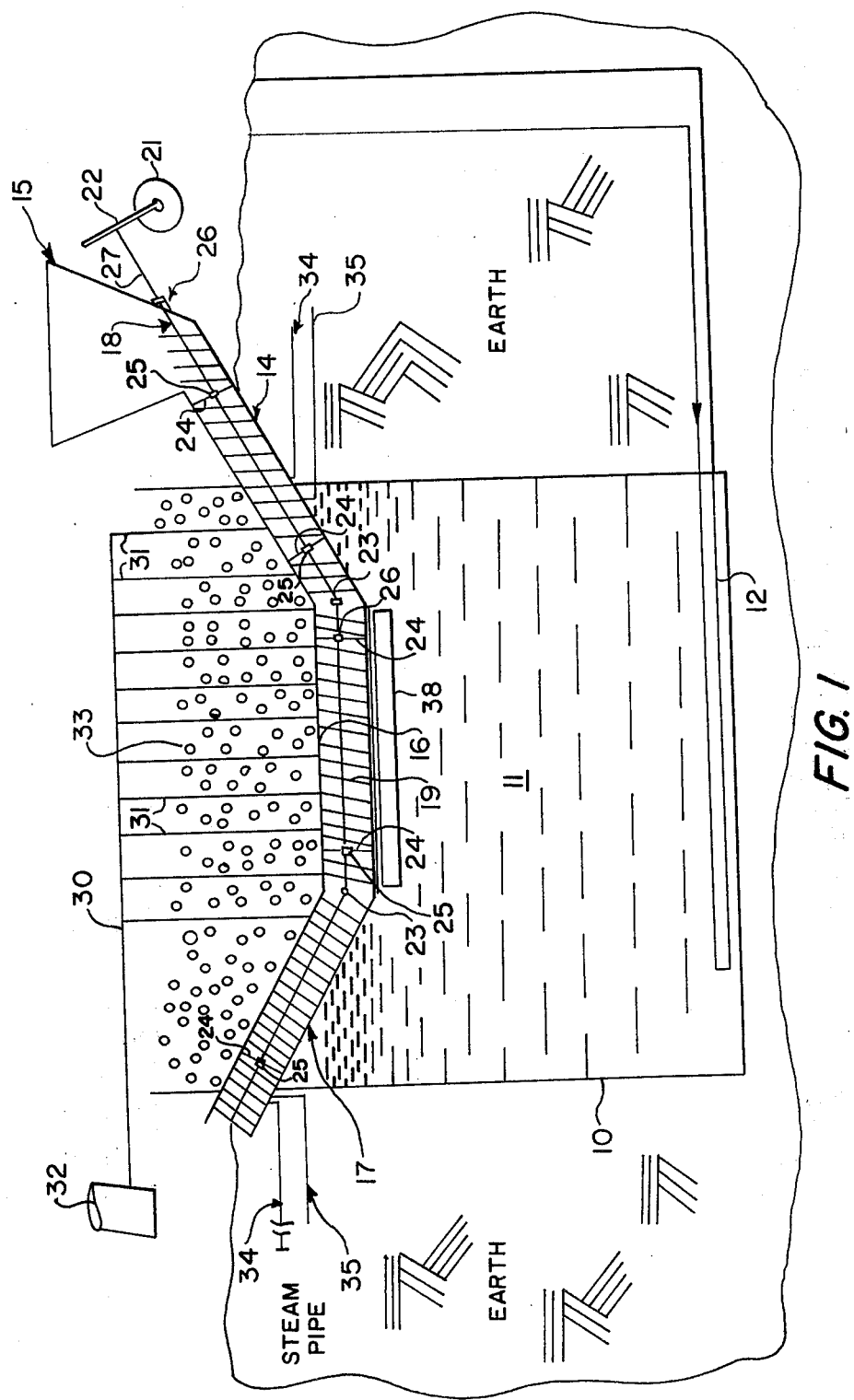
FIG. 1 illustrates a partial sectional view of a heat storage reservoir in combination with an oil shale processor.

Now refering to the drawings there is shown for illustrative purposes a partial cross sectional view of a heat transfer heat storage-heat withdrawal chemical processor such as an oil shale processing system. As shown, the system includes a heat transfer, heat storage system as set forth in patent application identified as Ser. No. 568,971 filed concurrent herewith. The system includes a large reservoir 10 containing a salt or salt eutectic 11 such as $NaCl + CaCl_2$ or $NaCl + MgCl_2$ therein to which heat is transfered by a network containing a plurality of pipes 12 near the bottom thereof. A chemical reaction takes place in the pipe network to produce heat. A chemical reaction chamber in the upper area of the reservoir includes a hopper 15 on the input end of a portion 14 that slopes downwardly from its input end to a central horizontal portion 16 that joins with a section 17 that slopes upwardly to an outlet. The chemical reaction chamber may be made in the form of a pipe which includes therein a three section helical screw 18, 19 and 20 which is driven by a motor 21 through a suitable drive shaft 22. The helical screw sections are joined by suitable universal joints 23 and is provided with spider supports 24 within which are mounted bearings 25 in order to support the helical screw member. A bearing 26 supports the helical screw shaft 27 where it passed through the hopper 15 and spider supports. Rotation of the helical screw feeds ground oil shale through the chemical reaction chamber in order to extract gas and oil vapors. The vaporized gas and oil vapors are fed through spaced output lines 31 to a main output line 30 that may be joined with on site fractionating columns or other components of an integrated oil refinery 32 shown in block form since it is not a portion of this invention. The upper surface of the salt eutectic and oil shale chemical reaction chamber are covered with pumice 33 or some other suitable heat insulator material to prevent the escape of heat from the salt. The vaporized gas and oil output lines pass through the pumice which also insulates the vaporized gas output lines. The input and output ends of the oil shale chemical reaction chamber are provided with steam input lines 34 which prevent the escape of gas and oil vapors out the ends, prevents the inflow of air, and aids in heating the oil shale. The steam may be generated by use of a separate solar system-heat reservoir or a steam reactor may be placed at the output end of the oil shale chemical reaction chamber where the hot spent oil shale is directed over the steam reactor to heat water that turns to steam. The spent oil shale should have a temperature of about 450° C to about 500° C which is sufficient to generate steam. Steam generation by use of the spent oil shale will aid in cooling the spent oil shale which is hauled away by trucks or carried away by use of an endless belt to a cool down area. An endless belt may also be used to deliver the ground oil shale to the hopper for reaction within the chemical reaction chamber. Increased internal heat conduction and increased volatile output where economically justified may be carried out by an input of hydrogen gas through lines 35.

Since the heat exchange, heat storage reservoir is considerably large, the reservoir is placed within the earth which serves as a heat insulator. Also it serves to place near ground level, the upper section of the reservoir within which the oil shale chemical reaction chamber is positioned.

Figure 2:
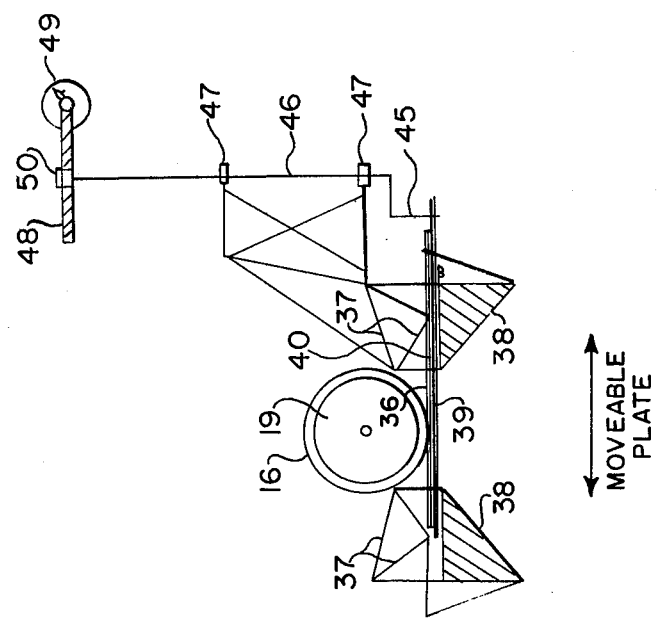
FIG. 2 illustrates a cross sectional view of the central pipe line container with means to scrape frozen salt away from the bottom of the pipe to permit heat transfer from the salt to the pipe.
Figure 3:
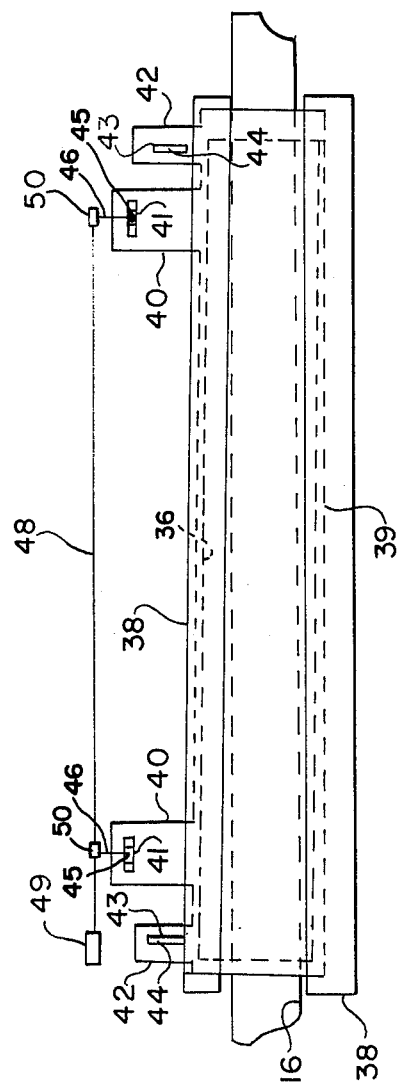
FIG. 3 illustrates a view from the bottom of the reservoir looking up to illustrate the "frozen" salt scraper mechanism.

The central horizontal section of the oil shale chemical reaction chamber is thermally connected in the bottom thereof with a horizontal flat metallic plate 36 (FIG. 2), which aids in conducting heat to the central section. The plate is supported by suitable rod-supports 37 which are secured to the chemical reaction chamber. The supports extend below the chamber and has secured thereto two scraper wedges 38 one on each side of the chamber. A movable slide plate 39 is secured just below the thermal conductor plate 36 and moves relative thereto in order to scrape "frozen" salt from the thermal conductor plate. The movable plate is provided with two tab extensions 40 each of which have linear slots 41 in the direction of the axis of the chamber. Two smaller tab extensions 42 are provided with a slot 43 in each tab extending in a direction perpendicular to the axis of the chamber. A vertically extending rod 44 is passed through each slot 43 and secured in place on the supporting structure to restrain the plate against axial movement while permitting back-and-forth horizontal movement. A pair of cranks having crank ends 45 that pass through slots 41 in tabs 40 are provided with crank shafts 46 that pass through supporting bearings 47 within which the cranks rotate. The upper end of the cranks are driven by a drive shaft 48 which is driven by a motor 49. The motor drives the drive shaft which rotates each of the cranks by suitable gear 50 connected thereto. The cranks provide movement to the movable plate. The movable plate moves along a horizontal line perpendicular to the shaft since the slots in tabs 42 and the fixed rod 44 restrain the axial movement of the plate. The rigidly secured thermal conductor plate 36 and the movable plate 39 adjacent thereto may include apertures therein so that the "frozen" salt may fall through the apertures to the area below the plates. FIGS. 2 and 3 illustrate different views of the rigidly mounted plate, the movable plate, the scrapers and the cranks that drive the movable plate. The salt frozen on the bottom of the thermal conductor plate will be scraped off and the loose salt on the upper side of the thermal plate will fall through the aperture therein, if so provided. The salt settles to the bottom and is heated to melt the salt for additional storage and transfer of heat.

In operation of the device illustrated in FIGS. 1–3, solar heat dissociates chemicals in solar furnaces, the chemicals are directed to the heating pipe network 12 in the bottom of the reservoir where the chemicals are recombined giving off heat. The heat heats the salt eutectic to melt the salt. The hot salt transmits heat to the oil shale chemical reactor chamber. Ground oil shale is delivered to the hopper then the helical screw delivers the oil shale to the hot chamber where the oil shale is continuously driven through the chamber. Steam is delivered to each end of the oil shale reaction chamber to prevent air from entering and for aiding in the distillation of the gases within the oil shale. Additionally hydrogen may be added to increase the internal heat conduction within the chamber thereby increasing the volatile output. The vaporized gas and oil vapors are drawn off by use of output lines 31 connected with the reaction chamber. The gases may be directed to input lines to fractionating columns or other components of an integrated oil refinery and the spent oil shale is carried off by trucks or a continuous belt. The hot spent oil shale may be directed over a water steam reactor to produce the steam necessary for feeding into each end of the reaction chamber. While as heat is withdrawn from the hot salt, "frozen" salt will form on the fixed thermal conductor plate, therefore the movable plate is operated to break the salt crust and keep the thermal plate clear of the "frozen" salt so that the greatest amount of heat will be withdrawn from the melted salt by the oil shale reaction chamber.

The electrical motors and other electrical devices requiring electrical energy such as for base operations can receive electrical energy in accordance with the solar heater electrical energy generation device such as disclosed in the above mentioned patent application identified as Ser. No. 568,970.

In destructively distilling away hydrocarbon gases and oils which enter the output lines, some steam, carbon monoxide and hydroben will enter the output lines. However air is excluded by the steam barriers provided at each end of the chemical reaction chamber.

Figure 4:
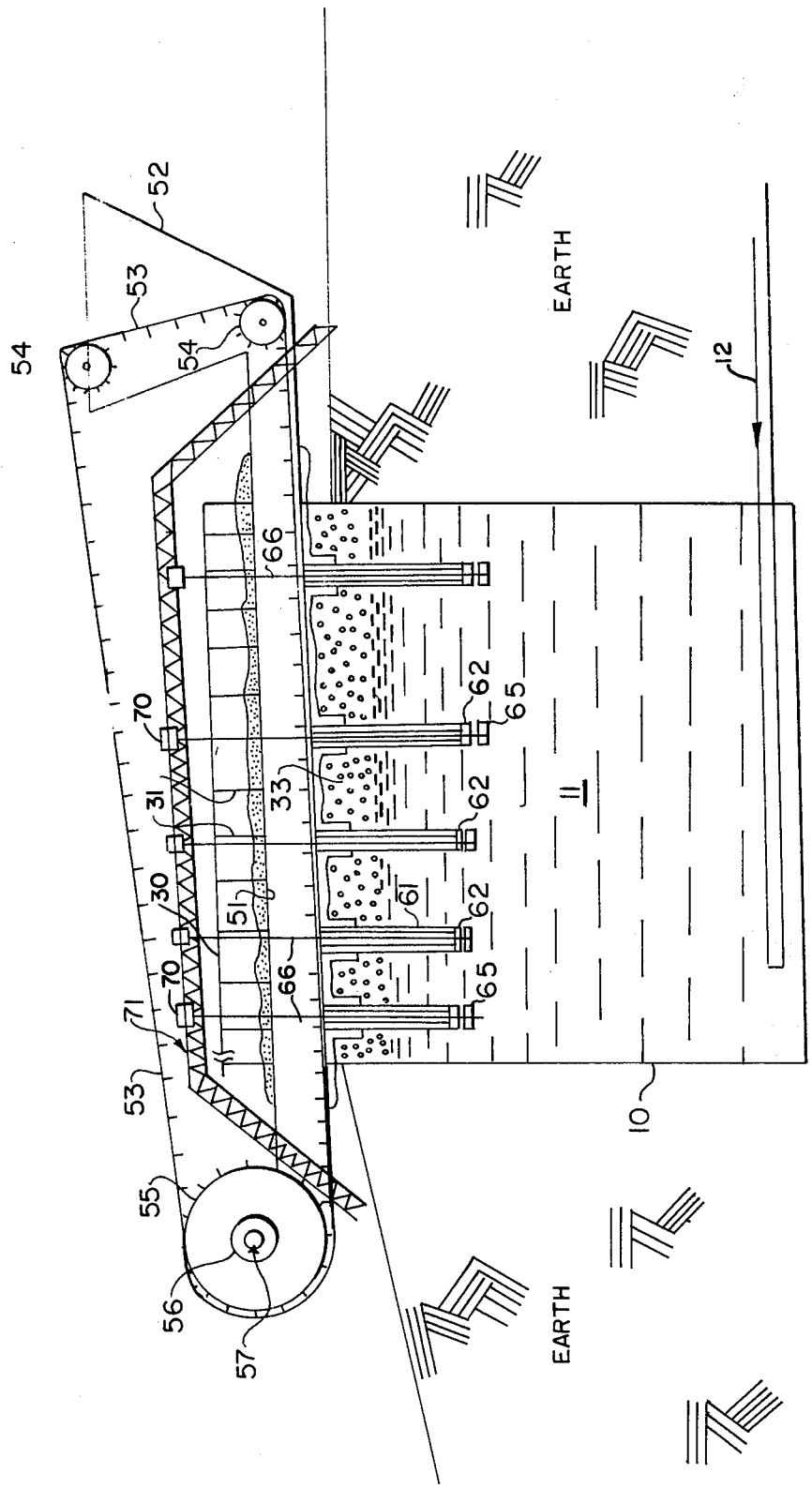
FIG. 4 is a partial cross sectional view of a modification of the device of FIG. 1 for processing oil shale to produce gas and evaporated oil by a different heat withdrawal arrangement.

FIGS. 4 and 5 illustrate a modification of the oil shale chemical reaction chamber by which ground oil shale is heated destructively distilling away hydrocarbon gases and oils which enter output line. The system makes use of the heat transfer-heat storage reservoir as set forth above for the system shown and described for FIG. 1. In this modification, the ground oil shale is heated by a different heat withdrawal system. The system includes a straight horizontal or slightly sloping pipe-like chamber 51 that spans the reservoir above the salt eutectic. A hopper 52 connects with the input end of the pipe-like chamber to receive the ground oil shale. A continuous link chain 53 passes through the hopper and the pipe-like chamber to feed the oil shale from the hopper, to and through the pipe-like chamber. The link chain is supported by suitable spocket wheels 54 and 55 and is driven by an electric motor 56 through a suitable reduction gear 57 which rotates the drive sprocket wheel 55. The spent oil shale is forced out the output end of the pipe-like chamber onto a continuous belt or dumped into trucks for hauling off. The vaporized oil and gas is carried off through suitable output pipes 31 which are secured to the chamber 51 at the top thereof.

The salt eutectic and the pipe-like chamber are covered with pumice 33 through which heat withdrawal heat pipe containers 61 pass. Each of the heat withdrawal pipe containers connect at one end to the outside of the pipe-like chamber and extend downwardly into the salt eutectic with a bend therein to offset the lower end from below the pipe-like chamber. The lower end of a plurality of pipe containers join with the upper end of a small volume toroidal reservoir 62 which contains therein a small amount of liquid mercury. Several pipe containers are connected to each toroidal reservoir with the pipes spaced around the top. FIG. 5 illustrates a section of one reservoir and the connected pipes. A top view of the toroidal reservoir is shown in FIG. 6. The center of the reservoirs are provided with a girder bearing support 63 upon which a bearing 64 is secured. A linear cutter blade 65 is secured adjacent the bottom of the reservoir by a drive shaft 66 that passes through bearing 64. The drive shaft 66 passes through additional supporting bearings 67 secured in place by girders 68 that are secured to the pipe-like chamber and is driven by a drive shaft 69 which is rotated by a motor 70 supported by girders 71. Each cutter shaft is provided with a separate motor thereby requiring a smaller motor, however one motor and suitable drives could be used. The cutter blades are rotated to keep the bottoms of the toroidal mercury, reservoirs clear of "frozen" salt so that the greatest amount of heat will be withdrawn from the salt and transmitted to the mercury in the reservoir.

The inlet and outlet ends of the pipe-like chamber are provided with steam barriers to prevent the oil and gas vapors from escaping and for preventing entrance of air. Further, the steam aids in volatilization of the hydrocarbons in the ground oil shale. Steam and hydrogen gas may be added as in the above described system of FIG. 1.

In operation of the system shown in FIGS. 4 and 5, the salt eutectic is heated by the pipe network 12 in the bottom of the reservoir. The hot salt heats the liquid mercury to form a gaseous mercury. The mercury gas condenses onto the pipe-like chamber transmitting heat to the ground oil shale which is slowly passing through the pipe-like chamber by the chain link belt. The hot mercury gas condensation produces heat which vaporizes the hydrocarbons in the oil shale to produce gas and oil vapors. The gas and oil vapors are carried off by the output pipes. The condensed mercury returns to the reservoir by gravity. During transfer of heat from the melted salt to the reservoir, the salt "freezes" onto the surface of the toroidal reservoirs, therefore cutter blades 65 are rotated by shaft 66 and motor 70 to cut the "frozen" salt away from the ends of the mercury reservoirs. The condensed mercury that returns to the reservoir is again heated to vapor which condenses onto the surface of the pipe-like chamber in a continuous action thereby continuously delivering heat to the pipe-like chamber while the condensed mercury returns to the reservoir for additional heating. The system will operate so long as the salt eutectic furnishes heat to the liquid mercury which transmits the heat to the pipe-like chamber.

Steam may be generated by use of the heat from the spent oil shale or by a separate solar heat-reservoir system. Further electrical energy may be generated using a solar heat-reservoir system as set forth in co-pending patent application Ser. No. 568,970.

These systems have been described for the purpose of heating ground oil shale to high temperatures thereby destructively distilling away hydrocarbon gases and oils which enter the output lines. Such systems may be used for heating other material from which reactants or products of reaction may be obtained.

Obviously many modification and variations of the present invention are possible in light of the above teachings. It is therefore to be understood that within the scope of the appended claims the invention may be practiced otherwise that as specifically described.

What is claimed and desired to be secured by Letters patent of the United States is:

1. A heat-transfer, heat reservoir, chemical processor which comprises:

a salt or salt eutectic reservoir;

means in the bottom of said reservoir for heating a salt eutectic within said reservoir;

a pipe-like chamber through which materials to be processed in said reservoir are transmitted;

means for transmitting said material through said pipe-like chamber;

means for withdrawing heat from said salt or salt eutectic in said reservoir and transmitting heat to said materials transmitted through said pipe-like chamber;

a mechanical means for removing salt deposits from said heat-withdrawal means; and output means connected with said pipe-like chamber for receiving gaseous products of reaction from said materials processed.

2. A heat transfer of heat reservoir, chemical processor as claimed in claim 1; in which said heat withdrawal means is immersed within said salt or salt eutectic.

3. A heat transfer, heat reservoir, chemical processor as claimed in claim 2; wherein, said salt is eutectic is $NaCl + CaCl_2$.

4. A heat transfer, heat reservoir, chemical processor as claimed in claim 2; wherein said salt eutectic is $NaCl + MgCl_2$.

5. A heat transfer, heat reservoir, chemical processor as claimed in claim 2; in which said heat withdrawal means comprises a plurality of toroidal reservoirs each connected with said pipe-like chamber by a plurality of pipe containers;

said reservoirs including liquid mercury therein (or other volatile liquid) which vaporizes and condenses upon said pipe-like chamber wall to heat said material therein.

* * * * *